United States Patent Office 3,542,834
Patented Nov. 24, 1970

3,542,834
HIGHER ALKYL CONTAINING DISILOXANOLS
Richard W. Alsgaard, Midland, Mich., assignor to Dow Corning Corporation, Midland, Mich., a corporation of Michigan
No Drawing. Filed Aug. 15, 1968, Ser. No. 752,775
Int. Cl. C07f 7/08
U.S. Cl. 260—448.2      2 Claims

ABSTRACT OF THE DISCLOSURE

Alkyldisiloxanols wherein the alkyl group contains 12 to 45 carbon atoms is disclosed. The alkyldisiloxanols include compounds of the formula $$(C_nH_{2n+1})\underset{\underset{CH_3}{|}}{\overset{\overset{CH_3}{|}}{Si}}-\underset{\underset{CH_3}{|}}{\overset{\overset{CH_3}{|}}{Si}}OH$$

wherein $n$ is 12 to 45 inclusive. The alkyldisiloxanols are useful as evaporation retardants. A specific example of the alkyldisiloxanols is a compound of the formula $$C_{18}H_{37}\underset{\underset{CH_3}{|}}{\overset{\overset{CH_3}{|}}{Si}}O-\underset{\underset{CH_3}{|}}{\overset{\overset{CH_3}{|}}{Si}}OH.$$

---

This invention relates to alkyldisiloxanols.

An object of the present invention is to provide a new class of alkyldisiloxanols which are useful as evaporation retardants.

This invention relates to an alkyldisiloxanol of the formula $$(C_nH_{2n+1})\underset{\underset{CH_3}{|}}{\overset{\overset{CH_3}{|}}{Si}}O-\underset{\underset{CH_3}{|}}{\overset{\overset{CH_3}{|}}{Si}}OH$$

wherein $n$ is an integer of from 12 to 45 inclusive.

The alkyldisiloxanols of the present invention can best be prepared by reacting one mole of an α-olefin with one mole of $[H(CH_3)_2Si]_2O$ in the presence of a platinum catalyst, such as chloroplatinic acid. The resulting product is a mono-adduct of the formula $$(C_nH_{2n+1})\underset{\underset{CH_3}{|}}{\overset{\overset{CH_3}{|}}{Si}}O-\underset{\underset{CH_3}{|}}{\overset{\overset{CH_3}{|}}{Si}}OH.$$

The mono-adduct can then be hydrolyzed by using water and a palladium on charcoal catalyst. The resulting product has a formula $$(C_nH_{2n+1})\underset{\underset{CH_3}{|}}{\overset{\overset{CH_3}{|}}{Si}}O-\underset{\underset{CH_3}{|}}{\overset{\overset{CH_3}{|}}{Si}}OH$$

and can be recovered by distillation.

The α-olefin can be any alkene which has a carbon-carbon double bond at a terminal carbon atom and having 12 to 45 carbon atoms. The α-olefins can be either straight chained or branched and include, for example, α-dodecene, α-tridecene, α-tetradecene, α-pentadecene, α-hexadecene, α-octadecene, α-nonadecene, $CH_2=CH(CH_2)_{20}CH_3$,
$CH_2=CH(CH_2)_7CH(CH_3)(CH_2)_6CH_3$,
$CH_2=CH(CH_2)_{42}CH_3$,
$CH_2=C(CH_2CH_2CH_3)(CH_2)_{10}CH_3$,
$CH_2=CH(CH_2)_{26}CH_3$,
$CH_2=CH(CH_2)_{21}CH_3$,
$CH_2=CH(CH_2)_{12}CH(CH_3)(CH_2)_2C(CH_3)_2(CH_2)_7CH_3$,
$CH_2=CH(CH_2)_{17}CH_3$ and
$CH_2=CH(CH_2)_{19}CH_3$.

The alkyldisiloxanols of this invention include, for example, $$CH_3(CH_2)_{11}\underset{\underset{(CH_3)_2}{|}}{\overset{\overset{(CH_3)_2}{|}}{Si}}-O-\underset{\underset{(CH_3)_2}{|}}{\overset{\overset{(CH_3)_2}{|}}{Si}}OH,\ CH_3(CH_2)_{12}\underset{\underset{(CH_3)_2}{|}}{\overset{\overset{(CH_3)_2}{|}}{Si}}-O-\underset{\underset{(CH_3)_2}{|}}{\overset{\overset{(CH_3)_2}{|}}{Si}}OH,$$

$$CH_3(CH_2)_{13}\underset{\underset{(CH_3)_2}{|}}{\overset{\overset{(CH_3)_2}{|}}{Si}}-O-\underset{\underset{(CH_3)_2}{|}}{\overset{\overset{(CH_3)_2}{|}}{Si}}OH,\ CH_3(CH_2)_{15}\underset{\underset{(CH_3)_2}{|}}{\overset{\overset{(CH_3)_2}{|}}{Si}}-O-\underset{\underset{(CH_3)_2}{|}}{\overset{\overset{(CH_3)_2}{|}}{Si}}OH,$$

$$CH_3(CH_2)_{17}\underset{\underset{(CH_3)_2}{|}}{\overset{\overset{(CH_3)_2}{|}}{Si}}-O-\underset{\underset{(CH_3)_2}{|}}{\overset{\overset{(CH_3)_2}{|}}{Si}}OH,\ CH_3(CH_2)_{19}\underset{\underset{(CH_3)_2}{|}}{\overset{\overset{(CH_3)_2}{|}}{Si}}-O-\underset{\underset{(CH_3)_2}{|}}{\overset{\overset{(CH_3)_2}{|}}{Si}}OH,$$

$$CH_3(CH_2)_{23}\underset{\underset{(CH_3)_2}{|}}{\overset{\overset{(CH_3)_2}{|}}{Si}}-O-\underset{\underset{(CH_3)_2}{|}}{\overset{\overset{(CH_3)_2}{|}}{Si}}OH,\ CH_3(CH_2)_{29}\underset{\underset{(CH_3)_2}{|}}{\overset{\overset{(CH_3)_2}{|}}{Si}}-O-\underset{\underset{(CH_3)_2}{|}}{\overset{\overset{(CH_3)_2}{|}}{Si}}OH,$$

$$CH_3(CH_3)_{39}\underset{\underset{(CH_3)_2}{|}}{\overset{\overset{(CH_3)_2}{|}}{Si}}-O-\underset{\underset{(CH_3)_2}{|}}{\overset{\overset{(CH_3)_2}{|}}{Si}}OH,\ CH_3(CH_2)_{22}\underset{\underset{(CH_3)_2}{|}}{\overset{\overset{(CH_3)_2}{|}}{Si}}-O-\underset{\underset{(CH_3)_2}{|}}{\overset{\overset{(CH_3)_2}{|}}{Si}}OH,$$

$$CH_3(CH_2)_7\overset{\overset{CH_3}{|}}{CH}(CH_2)_7\underset{\underset{(CH_3)_2}{|}}{\overset{\overset{(CH_3)_2}{|}}{Si}}-O-\underset{\underset{(CH_3)_2}{|}}{\overset{\overset{(CH_3)_2}{|}}{Si}}OH,$$

$$CH_3(CH_2)_{10}\overset{\overset{CH_3CH_2CH_2}{|}}{CH}CH_2\underset{\underset{(CH_3)_2}{|}}{\overset{\overset{(CH_3)_2}{|}}{Si}}-O-\underset{\underset{(CH_3)_2}{|}}{\overset{\overset{(CH_3)_2}{|}}{Si}}OH\ \text{and}\ CH_3(CH_2)_{44}\underset{\underset{(CH_3)_2}{|}}{\overset{\overset{(CH_3)_2}{|}}{Si}}-O-\underset{\underset{(CH_3)_2}{|}}{\overset{\overset{(CH_3)_2}{|}}{Si}}OH.$$

The alkyldisiloxanols of the present invention are particularly useful as evaporation retardants. The alkyldisiloxanols are applied to the surface of an aqueous body which is exposed to a gaseous atmosphere. The amount of alkyldisiloxanol applied is determined by several factors, such as, temperature of the aqueous body, temperature of the atmosphere above the aqueous body and the movement of the atmosphere or the aqueous body. The amount of the alkyldisiloxanol is usually applied to provide at least a monomolecular layer on the aqueous surface. However, more or less can be used depending upon the desired result. If one desires to control the rate of evaporation, one can apply less of the alkyldisiloxanol to provide some specific rate of evaporation which can be used as a means of controlling the temperature of an aqueous body.

The aqueous body can be a swamp, a field covered with water, a pond, a lake, a reservoir, or in a tank, in a ditch, in a dish, in a closed container with a controlled atmosphere and the like.

The alkyldisiloxanols can be applied to the aqueous body as is or in the form of an organic solution or by any other means suitable to disperse the compound over the aqueous surface.

The alkyldisiloxanols of the present invention retard the evaporation of water.

The following examples are illustrative only and should not be construed as limiting the invention which is properly delineated in the appended claims.

EXAMPLE 1

The following ingredients were mixed and allowed to stand in a sealed container overnight, 10 g. of $$[H(CH_3)_2Si]_2O$$

12.6 g. of octadecene-1 and 2 drops of a 1 weight percent solution of chloroplatinic acid in isopropanol. The resulting product was recovered by distillation (ca. 100° C.) and had a formula of $$C_{18}H_{37}\underset{\underset{CH_3)_2}{|}}{Si}\text{---}O\text{---}\underset{\underset{(CH_3)_2}{|}}{Si}H.$$

In a bottle, 7.6 g. of the above product, dioxane, a catalytic amount of palladium on charcoal and 0.35 g. of water was mixed and allowed to stand with occasional mixing. Hydrogen gas evolution began as soon as the ingredients were mixed. The solution was allowed to stand overnight. The solution was then filtered and distilled whereby the product of the formula $$C_{18}H_{37}\underset{\underset{(CH_3)_2}{|}}{Si}\text{---}O\text{---}\underset{\underset{(CH_3)_2}{|}}{Si}OH$$

was obtained.

A 10 weight percent solution of the $$C_{18}H_{37}\underset{\underset{(CH_3)_2}{|}}{Si}\text{---}O\text{---}\underset{\underset{(CH_3)_2}{|}}{Si}OH$$

in diethyl ether was prepared. Ten drops of the ether solution were placed on the surface of 100 g. of tap water in a 250 ml. stainless steel cup. The resulting assembly was placed in a controlled atmosphere of 65% relative humidity and 68° F. The weight of the cup, water and ether solution was initially made and then observed at time intervals of 1 day, 2 days, 5 days and 7 days. A control cup was also placed in the controlled atmosphere. The control was prepared as described above but without the $$C_{18}H_{37}\underset{\underset{(CH_3)_2}{|}}{Si}\text{---}O\text{---}\underset{\underset{(CH_3)_2}{|}}{Si}OH$$

solution. A solution prepared as described above was made and also tested as described above, except instead of the $$C_{18}H_{37}\underset{\underset{(CH_3)_2}{|}}{Si}\text{---}O\text{---}\underset{\underset{(CH_3)_2}{|}}{Si}H,\quad C_{18}H_{37}\underset{\underset{(CH_3)_2}{|}}{Si}\text{---}O\text{---}\underset{\underset{(CH_3)_2}{|}}{Si}OH$$

was used.

The results below are the percentages of water lost in a given period under the test conditions.

| Compound | Percent water loss after | | | | Percent savings over control |
|---|---|---|---|---|---|
| | 1 day | 2 days | 5 days | 7 days | |
| (1) Control | 7.3 | 14.7 | 35.0 | 47.2 | |
| (2) $C_{18}H_{37}\underset{(CH_3)_2}{Si}\text{---}O\text{---}\underset{(CH_3)_2}{Si}OH$ | 4.5 | 10.4 | 31.7 | 44.1 | 6.6 |
| (3) $C_{18}H_{37}\underset{(CH_3)_2}{Si}\text{---}O\text{---}\underset{(CH_3)_2}{Si}H$ | 8.9 | 17.3 | 44.9 | 65.1 | −37.9 |

EXAMPLE 2

When the following olefins are reacted with $$[H(CH_3)_2Si]_2O$$

and the process described in Example 1 is carried out, the products as shown in the following table are obtained.

| Olefin | Product |
|---|---|
| $CH_2=CH(CH_2)_{25}CH_3$ | $CH_3(CH_2)_{27}\underset{(CH_3)_2}{Si}\text{---}O\text{---}\underset{(CH_3)_2}{Si}OH$ |
| $CH_2=CH(CH_2)_9CH_3$ | $CH_3(CH_2)_{11}\underset{(CH_3)_2}{Si}\text{---}O\text{---}\underset{(CH_3)_2}{Si}OH$ |
| $CH_2=CH(CH_2)_{13}CH_3$ | $CH_3(CH_2)_{15}\underset{(CH_3)_2}{Si}\text{---}O\text{---}\underset{(CH_3)_2}{Si}OH$ |
| $CH_2=CH(CH_2)_{42}CH_3$ | $CH_3(CH_2)_{44}\underset{(CH_3)_2}{Si}\text{---}O\text{---}\underset{(CH_3)_2}{Si}OH$ |
| $CH_2=CH(CH_2)_7\underset{\underset{CH_3}{|}}{CH}(CH_2)_7CH_3$ | $CH_3(CH_2)_7\underset{\underset{CH_3}{|}}{CH}(CH_2)_9\underset{(CH_3)_2}{Si}\text{---}O\text{---}\underset{(CH_3)_2}{Si}OH$ |

That which is claimed is:
1. An alkyldisiloxanol having a formula $$(C_nH_{2n+1})\underset{\underset{CH_3}{|}}{\overset{\overset{CH_3}{|}}{Si}}O\text{---}\underset{\underset{CH_3}{|}}{\overset{\overset{CH_3}{|}}{Si}}OH$$

wherein $n$ is an integer of from 12 to 45.
2. The alkyldisiloxanol according to claim 1 wherein $n$ is 18.

References Cited
UNITED STATES PATENTS 2,432,665 12/1947 Hyde.
2,600,307 6/1952 Lucas et al.
3,132,167 5/1964 Boot et al.

TOBIAS E. LEVOW, Primary Examiner

P. F. SHAVER, Assistant Examiner